(12) United States Patent
Chiang et al.

(10) Patent No.: US 7,988,329 B2
(45) Date of Patent: *Aug. 2, 2011

(54) INPUT DEVICE CAPABLE OF ENHANCING SYMBOL READABILITY FOR ELECTRONIC PRODUCT

(75) Inventors: Jen-Hsiang Chiang, Taipei Hsien (TW); Hsin-Chuan Hsu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,818

(22) Filed: Jan. 25, 2011

(65) Prior Publication Data

US 2011/0116264 A1 May 19, 2011

Related U.S. Application Data

(63) Continuation of application No. 11/971,173, filed on Jan. 8, 2008, now Pat. No. 7,905,627.

(30) Foreign Application Priority Data

Sep. 12, 2007 (TW) ................................ 96134094 A (51) Int. Cl.
*F21V 1/00* (2006.01)
(52) U.S. Cl. .......... 362/237; 362/27; 362/228; 362/231; 362/613; 362/618
(58) Field of Classification Search ............... 362/23–24, 362/26–27, 88, 228, 230–231, 235–237, 362/600–601, 611, 613, 615, 618, 627
See application file for complete search history.

(56) References Cited

U.S. PATENT DOCUMENTS

| 5,276,591 | A | 1/1994 | Hegarty |
| 6,761,462 | B2 | 7/2004 | Yoshida |
| 7,002,649 | B2 | 2/2006 | Yuuki |
| 2007/0046502 | A1 | 3/2007 | Jan |
| 2009/0065337 | A1* | 3/2009 | Chiang et al. .................. 200/314 |

FOREIGN PATENT DOCUMENTS

TW 200307443 12/2003

OTHER PUBLICATIONS

Office action mailed on Nov. 23, 2010 for the Taiwan application No. TW096134094, p. 2 line 4~26, p. 3 line 1~26, p. 4 line 1~26, p. 5 line 1~26, p. 6 line 1~26, p. 7 line 1~26, p. 8 line 1~26, p. 9 line 1~26, p. 10 line 1~26, p. 11 line 1~26, p. 12 line 1~26, p. 13 line 1~18 and line 20~21.

* cited by examiner

*Primary Examiner* — Stephen F Husar
*Assistant Examiner* — Meghan Dunwiddie
(74) *Attorney, Agent, or Firm* — Winston Hsu; Scott Margo (57) ABSTRACT

An input device capable of enhancing symbol readability for an electronic product includes a plurality of keypads for displaying a plurality of first kind symbols and a plurality of second kind symbols; a detection unit for detecting an operation mode of the electronic device; and a control unit coupled to the detection unit and the plurality of keypads for controlling the plurality of keypads to display the plurality of first kind symbols or the plurality of second kind symbols according to a detection result of the detection unit.

7 Claims, 14 Drawing Sheets

INPUT DEVICE CAPABLE OF ENHANCING SYMBOL READABILITY FOR ELECTRONIC PRODUCT

CROSS REFERENCE TO RELATED APPLICATIONS

This is a continuation application of application Ser. No. 11/971,173, filed Jan. 8, 2008, which is included in its entirety herein by reference.

BACKGROUND OF THE INVENTION

1. Field of the Invention

The present invention is related to an input device for an electronic device, and more particularly, to an input device capable of effectively enhancing symbol readability through colored lights mixture.

2. Description of the Prior Art

With the progress of technology, handheld electronic devices have a variety of functions, so that input keypads thereof become complicated, which make users confuse and decreases convenience.

Figure 1:
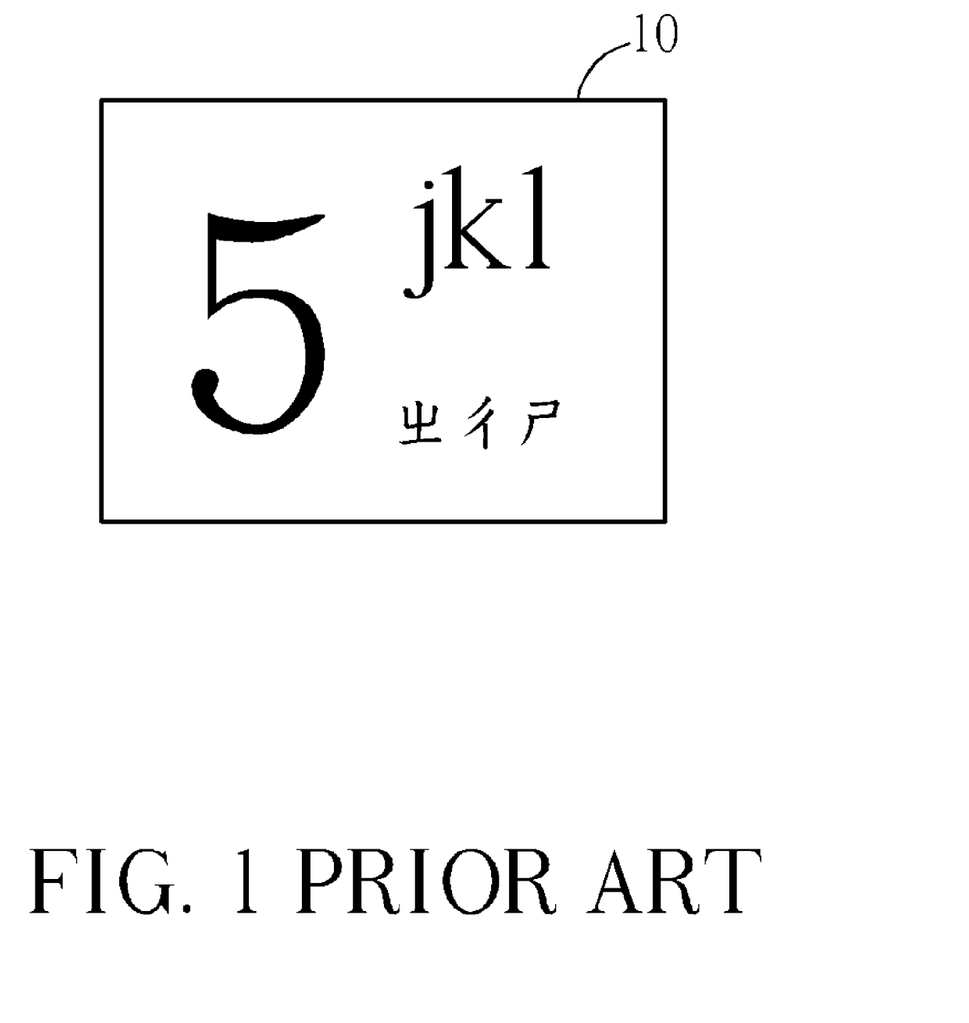
FIG. 1 illustrates a schematic diagram of a keypad of a mobile phone in the prior art.

Please refer to FIG. 1. FIG. 1 illustrates a schematic diagram of a keypad 10 of a mobile phone in the prior art. The keypad 10 is corresponding to an Arabic numeral 5, three English alphabets, and three Chinese phonetic alphabets. In the keypad 10, except the Arabic numeral 5, the English alphabets and Chinese phonetic alphabets are small and unobvious. In other words, the user has a hard time finding correct symbols when inputting English or Chinese characters.

Figure 2:
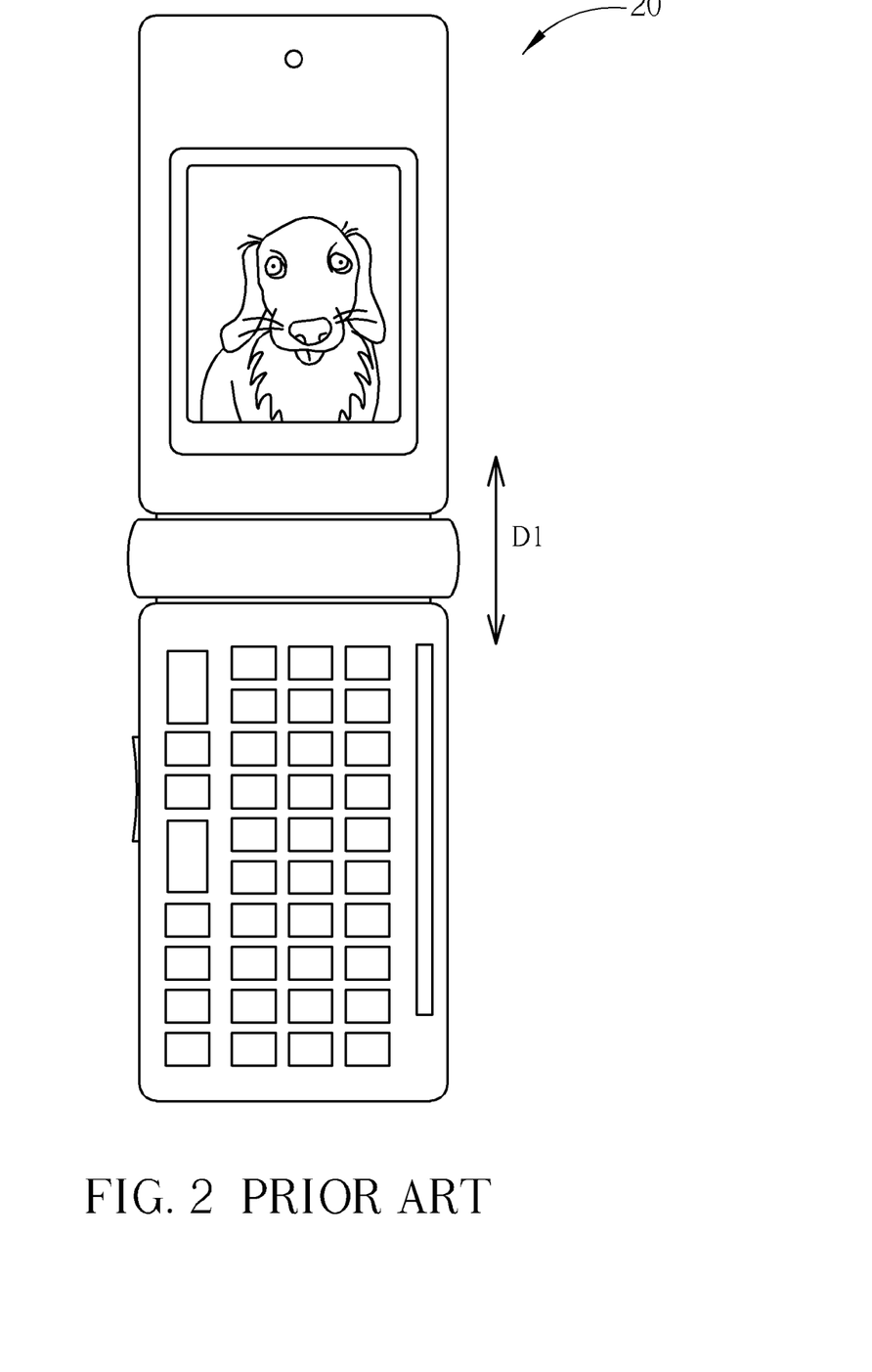
FIG. 2 and FIG. 3 illustrate schematic diagrams of two display modes of a prior art PDA phone.
Figure 3:
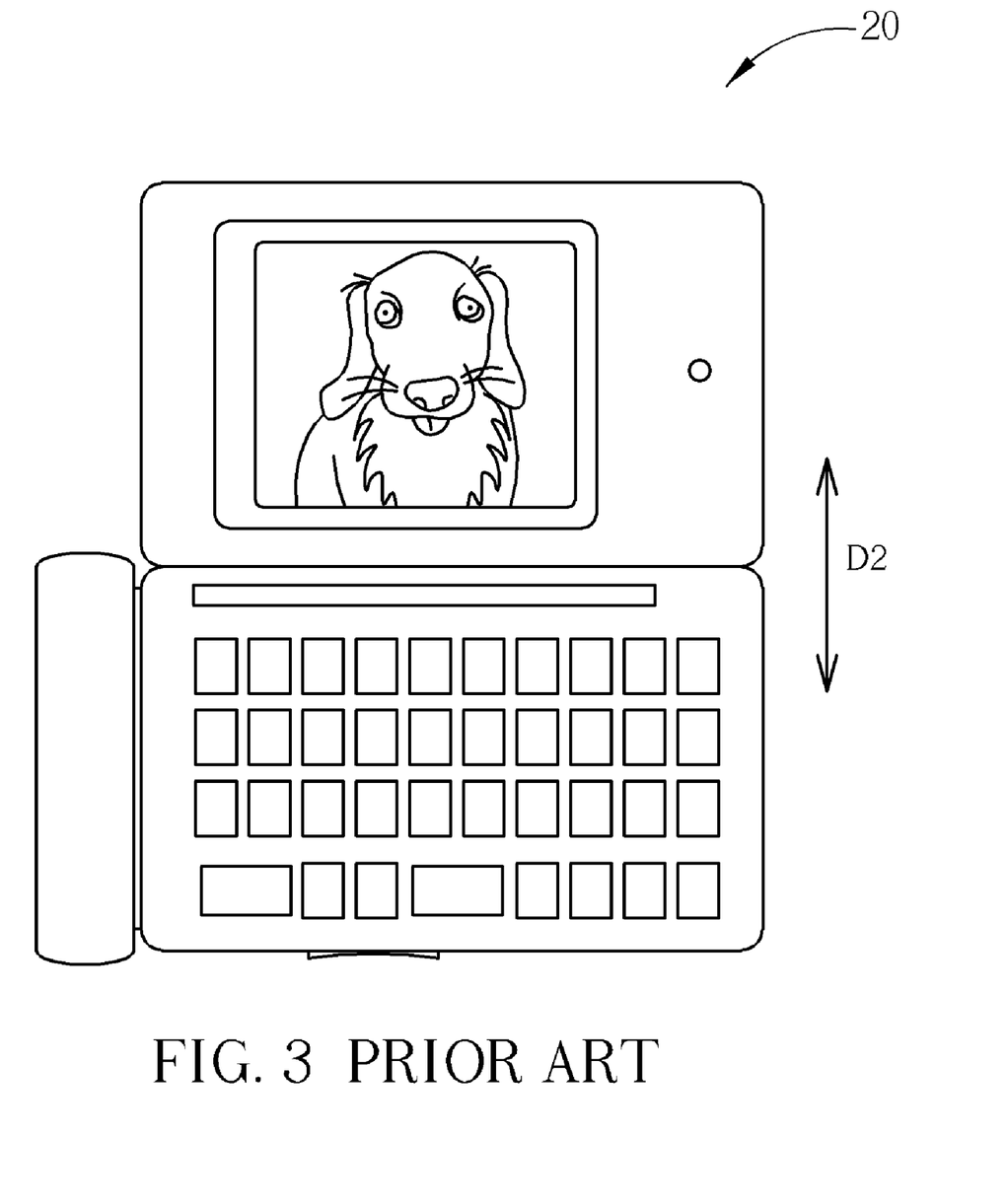
Figure 4:
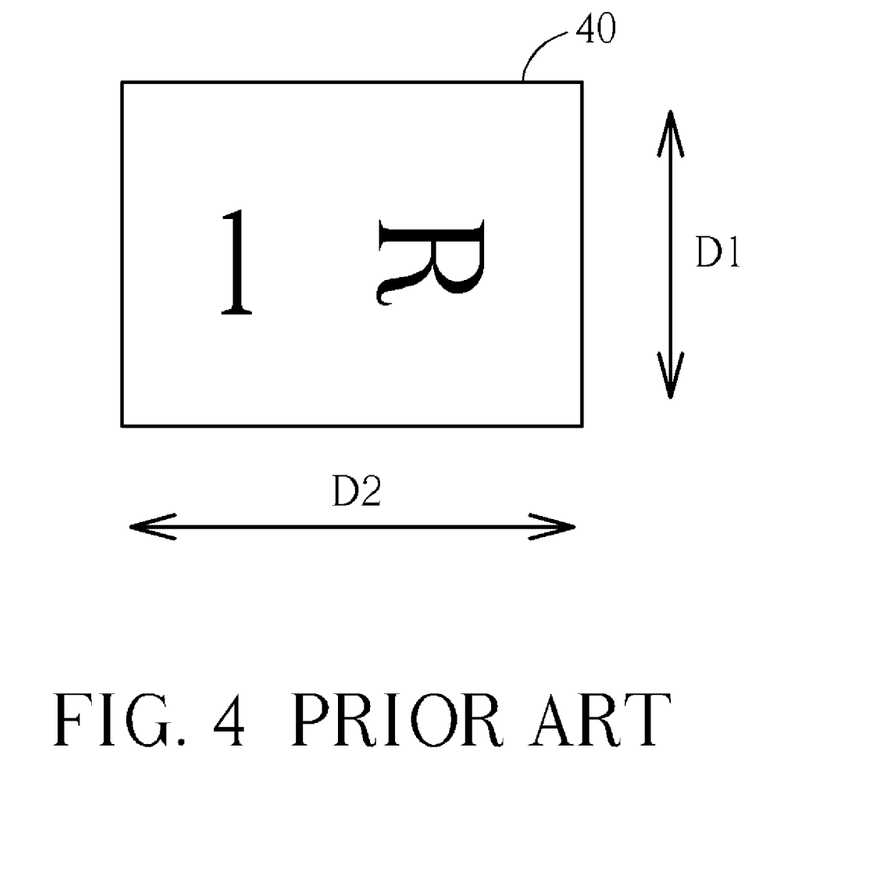
FIG. 4 illustrates a schematic diagram of a keypad of the PDA phone shown in FIG. 2.
Figure 11:
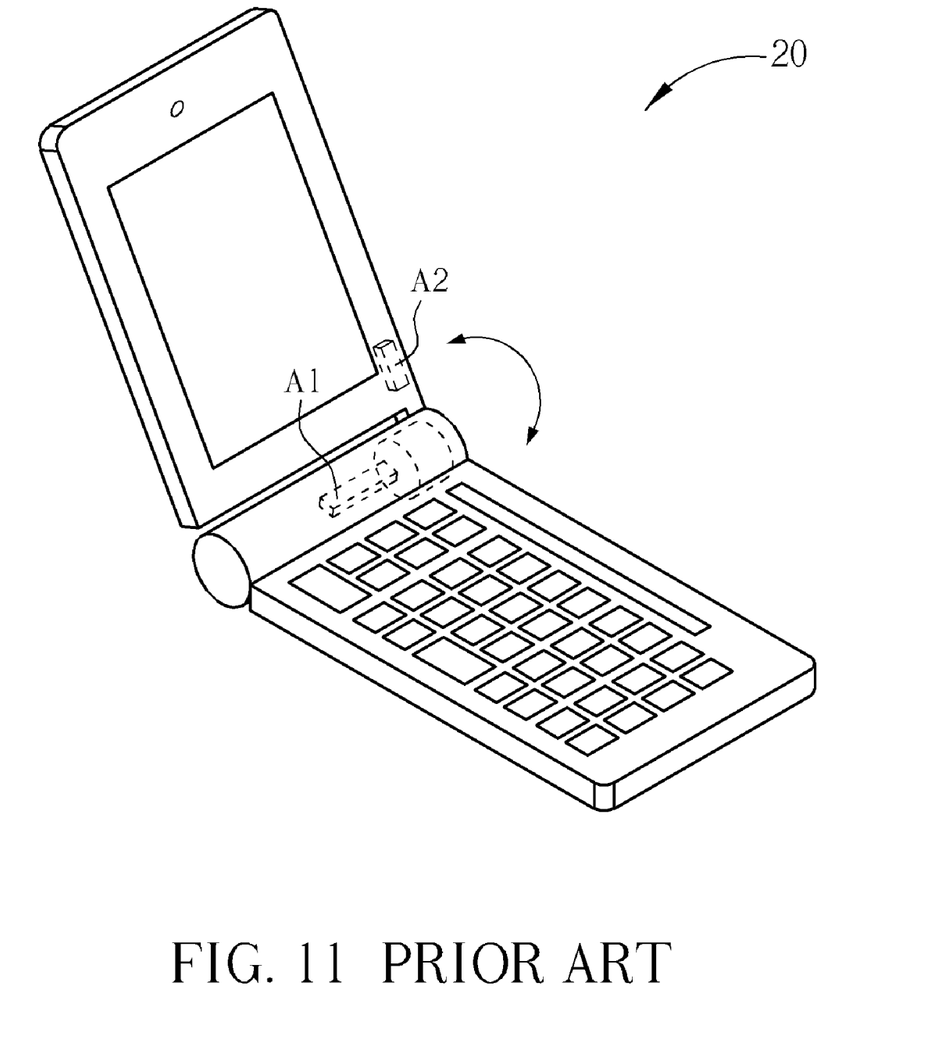
FIG. 11 and FIG. 12 illustrate schematic diagrams of a rotating shaft of the PDA phone shown in FIG. 2.
Figure 12:
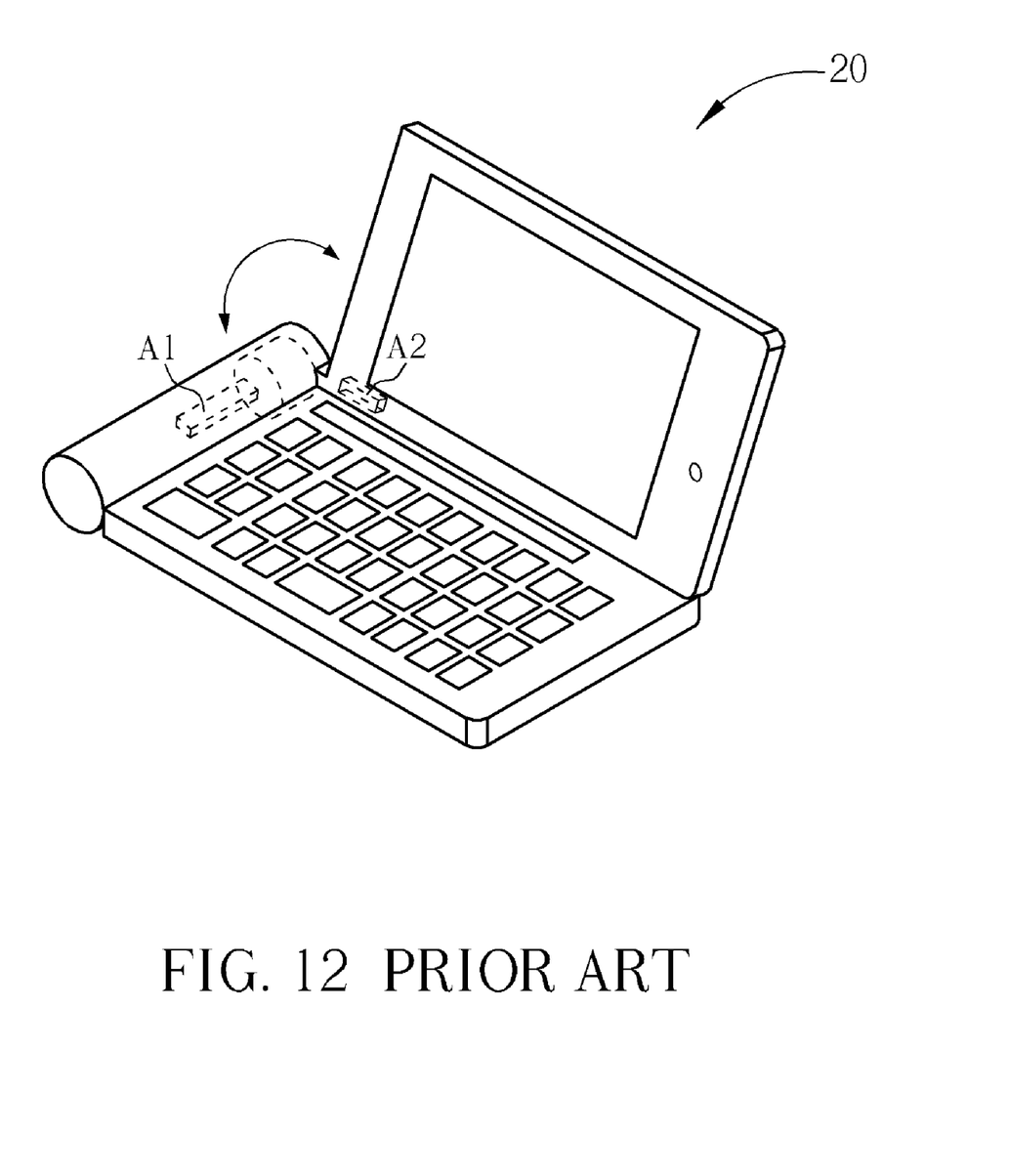

In order to improve the above-mentioned problem, the prior art discloses a personal digital assistant (PDA) phone, which switches display modes when rotating or reversing a screen, and thus classifies different input modes. For example, please refer to FIG. 2 to FIG. 4, and refer to FIG. 11 and FIG. 12. FIG. 2 and FIG. 3 illustrate schematic diagrams of two display modes of the prior art PDA phone 20. FIG. 4 illustrates a schematic diagram of a keypad 40 of the PDA phone 20. FIG. 11 and FIG. 12 illustrate schematic diagrams of a shaft of the PDA phone 20. As shown in FIG. 2, FIG. 3, FIG. 11, and FIG. 12, the PDA phone 20 can achieve display modes of portrait and landscape orientations (along directions D1 and D2 or along axes A1 and A2) by rotating the screen, corresponding to functions of phone and PDA. In order to match the requirements of the display modes, the numeral parts of the keypads of the PDA phone 20 are shown along the direction D1, while the English alphabet parts are along the direction D2. For example, in the keypad 40, "1" is along the direction D1, while "R" is along the direction D2. Therefore, when making a phone call with the PDA phone 20, the user can input a phone number with the display mode shown in FIG. 2. When using the personal digital assistance of the PDA phone 20, the user can rotate the screen of the PDA phone 20 to input data with the display mode shown in FIG. 3.

The PDA phone 20 can decrease the complexity of discrimination between different keypad contents. However, the combination of portrait-orientated letters and landscape-orientated letters makes the user confuse and affects convenience as the number of keypads increases.

SUMMARY OF THE INVENTION

It is therefore a primary objective of the claim invention to provide an input device capable of enhancing symbol readability for an electronic product.

The present invention discloses an input device capable of enhancing symbol readability for an electronic product, which comprises a plurality of keypads for displaying a plurality of first kind symbols and a plurality of second kind symbols; a detection unit for detecting an operation mode of the electronic device; and a control unit coupled to the detection unit and the plurality of keypads for controlling the plurality of keypads to display the plurality of first kind symbols or the plurality of second kind symbols according to a detection result of the detection unit. One of the plurality of keypads comprises a substrate; a first light-emitting device deployed on the substrate for generating a first colored light source; a second light-emitting device deployed on the substrate for generating a second colored light source different from the first colored light source; a first transparent board made of a translucent material of a first color for displaying a first symbol, and deployed on the first light-emitting device and the second light-emitting device; a second transparent board made of a translucent material of a second color for displaying a second symbol, and deployed on the first light-emitting device and the second light-emitting device; a transparent film deployed on the first transparent board and the second transparent board; and a third transparent board made of a translucent material of a third color, and deployed under the transparent film. A combination color of the first color and the third color is a complementary color to the first colored light source, and a combination color of the second color and the third color is a complementary color to the second colored light source.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
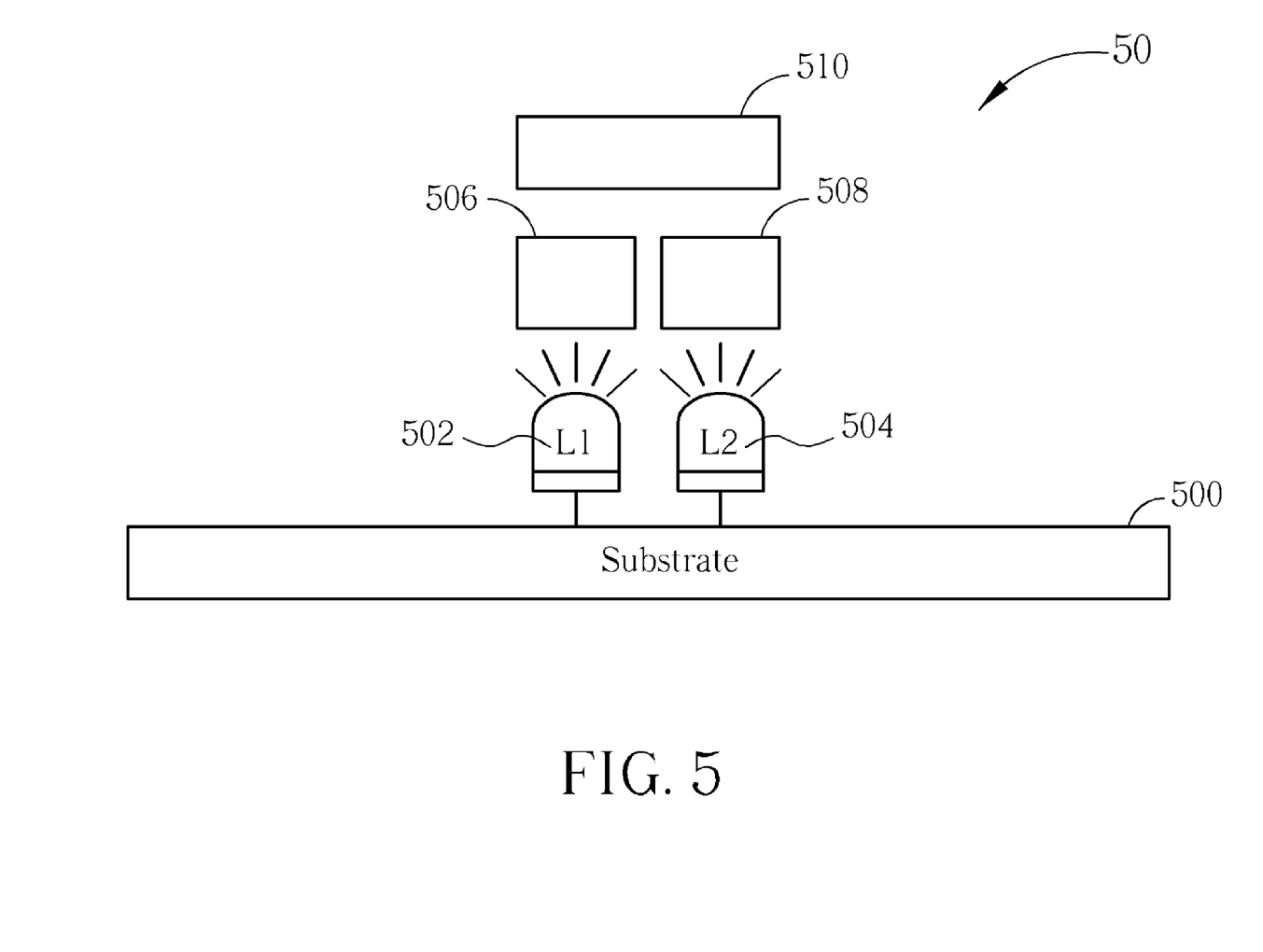
FIG. 5 illustrates a schematic diagram of a keypad device according to an embodiment of the present invention.

Please refer to FIG. 5. FIG. 5 illustrates a schematic diagram of a keypad device 50 according to an embodiment of the present invention. The keypad device 50 comprises a substrate 500, a first light-emitting device 502, a second light-emitting device 504, a first transparent board 506, a second transparent board 508, and a transparent film 510. The first light-emitting device 502 and the second light-emitting device 504 are both electrically coupled to the substrate 500 for generating a first colored light source L1 and a second colored light source L2 respectively. The first transparent board 506 and the second transparent board 508 is respectively made of a translucent material of a first color and a second color for displaying a first symbol and a second symbol where the transparent boards are deployed on the first light-emitting device 502 and the second light-emitting device 504. The first color is a complementary color to the first colored light source, and the second color is a complementary color to the second colored light source. Moreover, the transparent film 510 is deployed on the first transparent board 506 and the second transparent board 508 where the transparent film is also used to protect the keypad device 50.

According to the color composition theory, the interlacing of two complementary colors generates white or blank light and the energy will be declined. Therefore, the first colored light source L1 projected from the first light-emitting device 502 passing through the first transparent board 506 will generate low energy white light. And the first colored light source L1 passing through the second transparent board 508 will generate colored light. On the contrary, the second colored light source L2 projected from the second light-emitting device 504 passing through the second transparent board 508 will generate low power white light. And the second colored light source L2 passing through the first transparent board 506 will generate colored light. In such situation, only using a control unit (not shown in FIG. 5) for switching the first light-emitting device 502 and the second light-emitting device 504, the keypad device 50 can switch to display the first symbol or the second symbol. Therefore, the discrimination between the first symbol and the second symbol can be improved so to enhance the using convenience.

Figure 6:
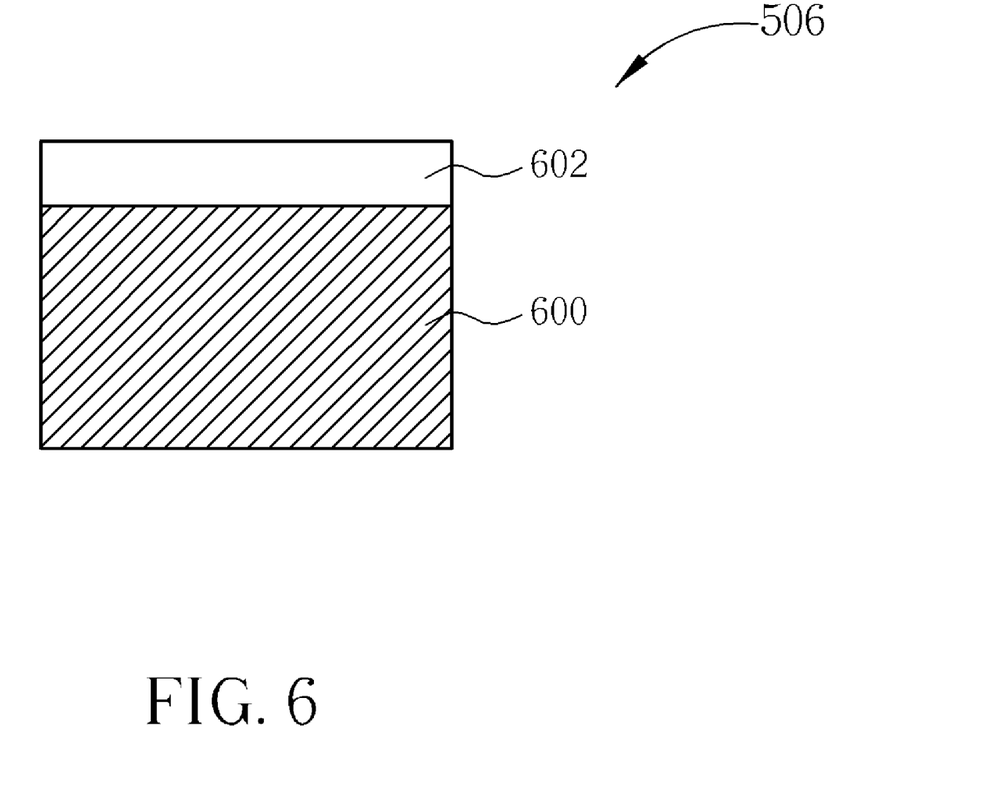
FIG. 6 illustrates a lateral-view diagram of the first transparent board shown in FIG. 5.
Figure 7:
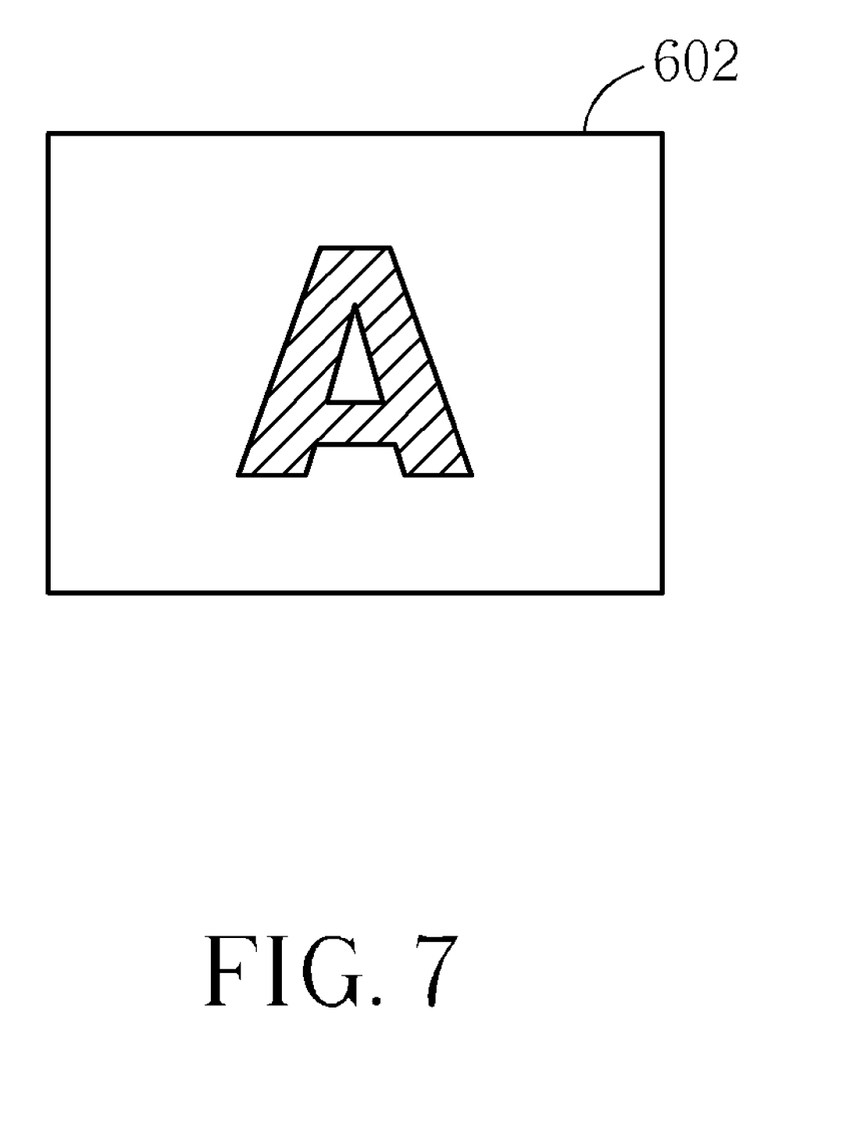
FIG. 7 illustrates a top-view diagram of the first transparent board shown in FIG. 5.

The keypad device 50 shown in FIG. 5 is an exemplary embodiment of the present invention. The main idea is a colored light source will turn into low energy white light when passing through the transparent material of the complementary color. Those skilled in the art can modify according to the main idea, not limited to the embodiment shown in FIG. 5. For example, please refer to FIG. 6 and FIG. 7. FIG. 6 illustrates a lateral-view diagram of the first transparent board 506 shown in FIG. 5. FIG. 7 illustrates a top view schematic diagram of the first transparent board 506 shown in FIG. 5. The first transparent board 506 comprises a first translucent film 600 and a gobo board 602. The first translucent film 600 is made of a translucent material of a first color. The gobo board 602 is deployed on the translucent film 600 for displaying the first symbol by means of blocking light where the letter "A" is made as an example. In other words, the basket part of the gobo board 602 is corresponding to the first symbol, which is formed through laser cutting. FIG. 6 illustrates an embodiment of the first transparent board 506. The embodiment of the second transparent board 508 is as similar as the first transparent board 506, and is not be narrated in detail here.

Figure 13:
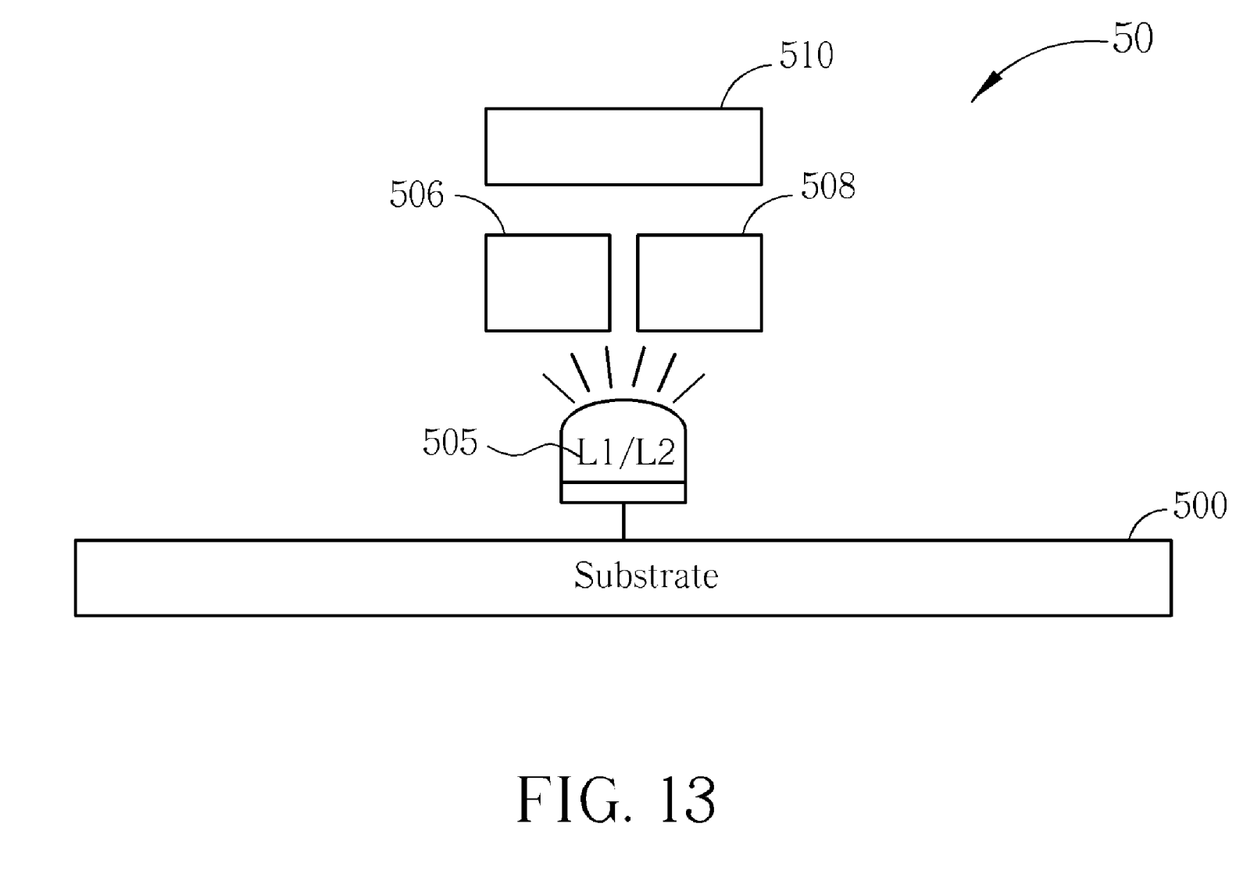
FIG. 13 and FIG. 14 illustrate schematic diagrams of alterations of the keypad device shown in FIG. 5 according to embodiments of the present invention.
Figure 14:
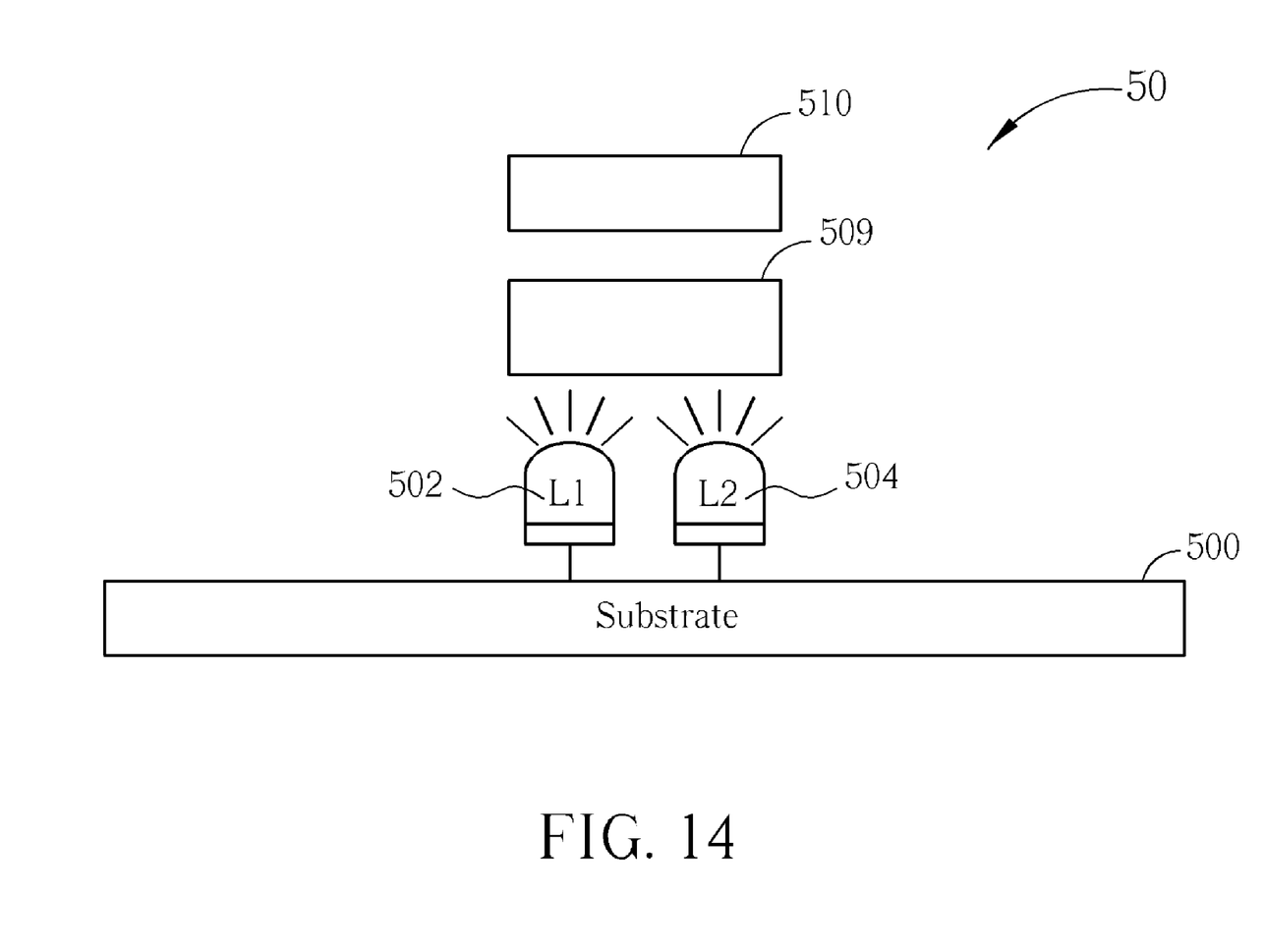

Besides, to reduce production cost and keypad volume, the first light-emitting device 502 and the second light-emitting device 504 can be integrated into an identical light-emitting device 505 as shown in FIG. 13, which can emit colored light sources L1/L2. Similarly, the first transparent board 506 and the second transparent board 508 can be integrated into a transparent board 509 as shown in FIG. 14. On the other hand, to achieve better effect, the transparent film 510 can conduct a sputtering process. As those skilled in the art recognized, after the sputtering process, the transparent film 510 can generate the effect of a solar window film. The effect is half-hidden and half-transparent. In such condition, the first transparent board 506 emits low energy white light and the second transparent board 508 emits colored light when turning on the first light-emitting device 502 and turning off the second light-emitting device 504. After the transparent film 510 conducts the sputtering process, the first symbol corresponding to the first transparent board 506 becomes unobvious and the second symbol corresponding to the second transparent board 508 becomes more obvious. On the contrary, the first symbol corresponding to the first transparent board 506 becomes more obvious, and the second symbol corresponding to the second transparent board 508 becomes unobvious when turning off the first light-emitting device 502 and turning on the second light emitting device 504.

Figure 8:
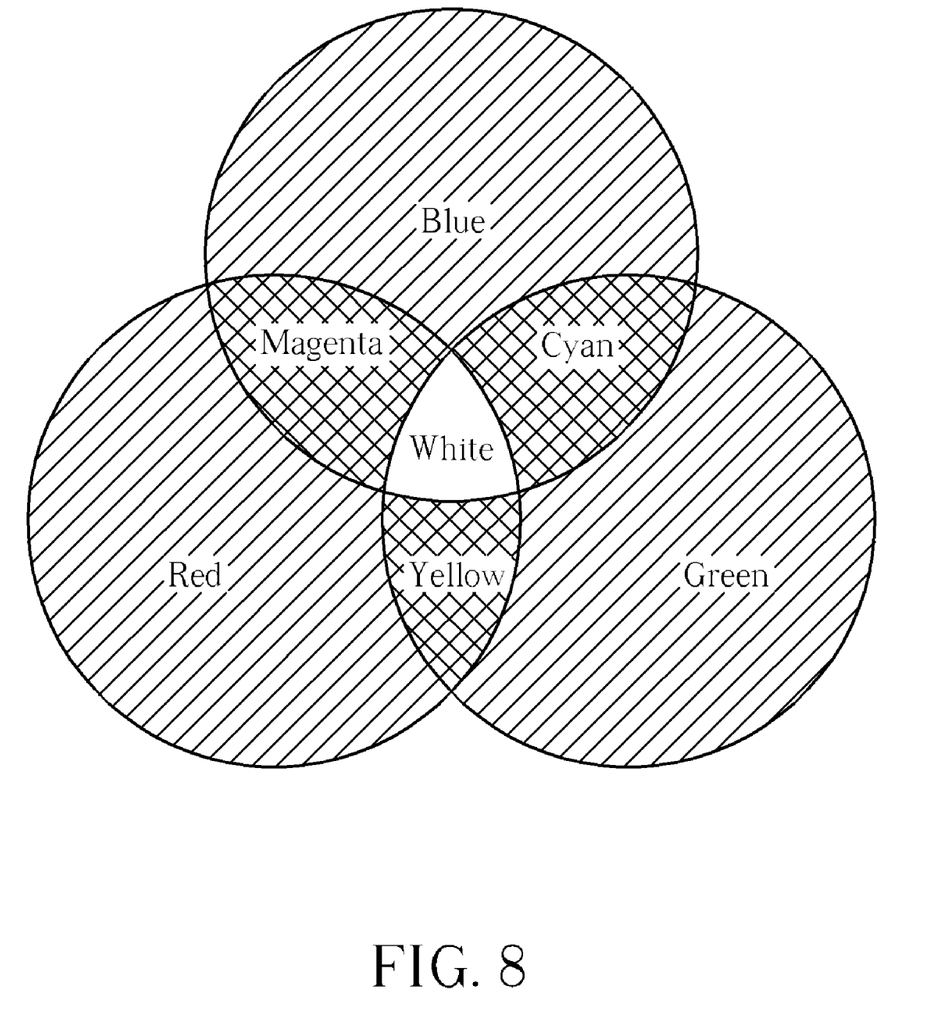
FIG. 8 illustrates a schematic diagram of the optical mixing principle.

The keypad device 50 generates the right symbol by switching between the first light-emitting device 502 and the second light-emitting device 504 through colored lights mixture. The first colored light source L1 projected from the first light-emitting device 502 and the second colored light source L2 projected from the second light-emitting device 504 only need to be different. Colors of the first transparent board 506 and the second transparent board 508 should be the complementary colors of the first colored light source L1 and the second colored light source L2, which can refer to a schematic diagram of the light mixing principle shown in FIG. 8. For example, if the color of the first colored light source L1 projected from the first light-emitting device 502 is red and the color of the second colored light source L2 projected from the second light-emitting device 504 is blue, the color of the first transparent board 506 should be cyan and the color of the second transparent board 508 should be magenta. As a result, those skilled in the art can choose right light-emitting devices and transparent boards.

Figure 9:
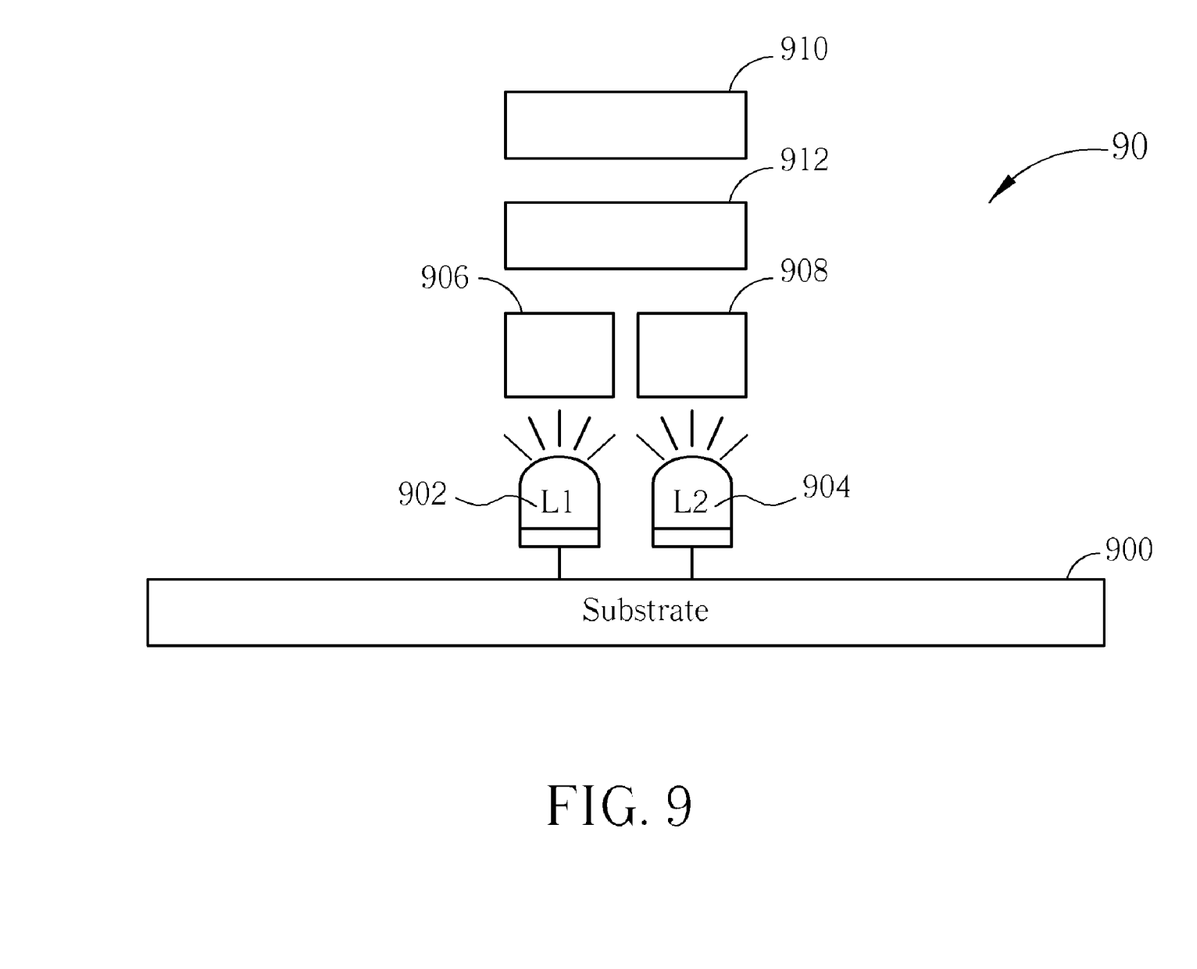
FIG. 9 illustrates a schematic diagram of a keypad device according to an embodiment of the present invention.

Please refer to FIG. 9. FIG. 9 illustrates a schematic diagram of a keypad device 90 according to an embodiment of the present invention. The keypad device 90 comprises a substrate 900, a first light-emitting device 902, a second light-emitting device 904, a first transparent board 906, a second transparent board 908, a transparent film 910, and a third transparent board 912. The structure and operation principle of the keypad device 90 are similar to those of the keypad device 50 shown in FIG. 5. The difference is that a combination color of colors of a first transparent board 906 and a third transparent board 912 is a complementary color of a color of a first colored light source L1 projected from a first light-emitting device 902, while a combination color of colors of a second transparent board 908 and a third transparent board 912 is a complementary color of a color of a second colored light source L2 projected from a second light-emitting device 904. In other words, the complementary colors of the colors of the first colored light source L1 and the second colored light source L2 are made up through different transparent boards in the keypad device 90. For example, if the colors of the first colored light source L1 projected from the first light-emitting device 902 and the second colored light source L2 projected from the second light-emitting device 904 are red and green, the colors of the third transparent board 912, the first transparent board 906, and the second transparent board 908 are respectively blue, green, and red. Therefore, when the first light-emitting device 902 is turned on and the second light-emitting device 904 is turned off, a first symbol corresponding to the first transparent board 906 becomes unobvious and a second symbol corresponding to the second transparent board 908 becomes obvious. On the contrary, when the first light-emitting device 902 is turned off and the second light-emitting device 904 is turned on, the first symbol corresponding to the first transparent board 906 becomes obvious and the second symbol corresponding to the second transparent board 908 becomes unobvious.

In the FIG. 9, the third transparent board 912 is formed between the transparent film 910 and the first transparent board 906. The third transparent board 912 is also formed between the transparent film 910 and the second transparent board 908. Besides, the third transparent board 912 can be formed between the first transparent board 906 and the second transparent board 908. The third transparent board 912 can be formed between the first light-emitting device 902 and the second light-emitting device 904. On the other hand, implementations of the first transparent board 906 and the second transparent board 908 can be achieved as FIG. 6 and FIG. 7. The transparent film 910 can conduct the sputtering process to increase readability.

Figure 10:
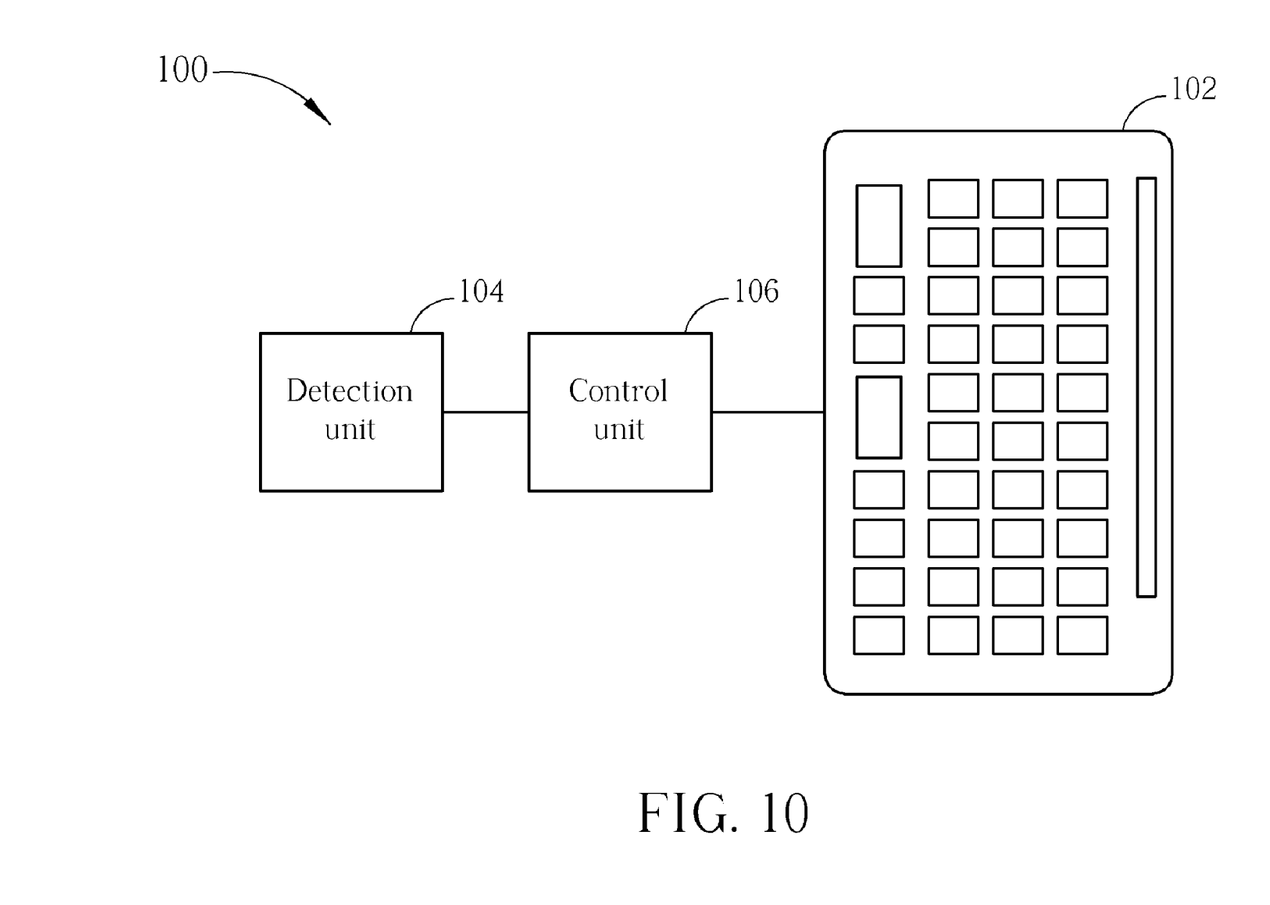
FIG. 10 illustrates a schematic diagram of an input device for an electronic device according to an embodiment of the present invention.

In brief, the keypad device 50 and the keypad device 90 are capable of enhancing symbol readability, so to bring the using convenience. Therefore, the keypad device 50 and the keypad device 90 can be wildly used in input devices of electronic devices. Please refer to FIG. 10. FIG. 10 illustrates a schematic diagram of an input device 100 of an electronic device according to an embodiment of the present invention. The input device is utilized for increasing keypad readability, and comprises a keyboard 102, a detection unit 104, and a control unit 106. The keyboard 102 comprises a plurality of keypads realized according to the keypad device 50 or the keypad device 90, and is utilized for displaying a plurality of first kind symbols and a plurality of second kind symbols. The detection unit 104 is utilized for detecting an operating mode of the electronic device (e.g. portrait or landscape display mode). The control unit 106 is coupled between the detection unit 104 and the keypad 102 for controlling each keypad of the keyboard 102 to display a first kind symbol or a second kind symbol according to the detection result of the detection unit 104. For example, when the input device 100 is applied in the PDA phone 20 shown in FIG. 2 and FIG. 3, the detection unit 104 can determine the operating mode of the PDA phone 20 according to whether the PDA phone 20 rotates along the axis A1 or A2, so as to turn on or turn off two colored sources in the keyboard 102 to display the right symbol through the control unit 106. As a result, when the PDA phone 20 operates in the portrait mode, only portrait-oriented symbols in the keyboard 102 become obvious, while landscape-oriented symbols become unobvious. On the contrary, when the PDA phone 20 operates in the landscape mode, only landscape-oriented symbols in the keypad 102 become obvious, while portrait-oriented symbols become unobvious.

In summary, the present invention uses the light mixing principle to switch light-emitting devices, to effectively enhance symbol readability and improve utility convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input device capable of symbol identification for an electronic product comprising:
    a plurality of keypads for displaying a plurality of first kind symbols and a plurality of second kind symbols;
    a detection unit for detecting an operation mode of the electronic device; and
    a control unit coupled to the detection unit and the plurality of keypads for controlling the plurality of keypads to display the plurality of first kind symbols or the plurality of second kind symbols according to a detection result of the detection unit;
    wherein one of the plurality of keypads comprises:
    a substrate;
    a first light-emitting device deployed on the substrate for generating a first colored light source;
    a second light-emitting device deployed on the substrate for generating a second colored light source different from the first colored light source;
    a first transparent board made of a translucent material of a first color for displaying a first symbol, and deployed on the first light-emitting device and the second light-emitting device;
    a second transparent board made of a translucent material of a second color for displaying a second symbol, and deployed on the first light-emitting device and the second light-emitting device;
    a transparent film deployed on the first transparent board and the second transparent board; and
    a third transparent board made of a translucent material of a third color, and deployed under the transparent film;
    wherein a combination color of the first color and the third color is a complementary color to the first colored light source, and a combination color of the second color and the third color is a complementary color to the second colored light source.

2. The input device of claim 1, wherein the first light-emitting device and the second light-emitting device are integrated into a light-emitting device, and the first transparent board and the second transparent board are integrated into a transparent board.

3. The input device of claim 1, wherein the first transparent board comprises:
    a first translucent film deployed on the first light-emitting device and the second light-emitting device, wherein the first translucent film performs the same color as the first color; and
    a first gobo board deployed on the first translucent film for displaying the first symbol by means of blocking light;
    wherein the second transparent board comprises:
    a second translucent film deployed on the first light-emitting device and the second light-emitting device, wherein the second translucent film performs the same color as the second color; and
    a second gobo board deployed on the second translucent film for displaying the second symbol by means of blocking light.

4. The input device of claim 1, wherein the transparent film conducts a sputtering process.

5. The input device of claim 1, wherein the third transparent board is deployed between the transparent film and the transparent boards.

6. The input device of claim 1, wherein the third transparent board is deployed on the first light-emitting device and the second light-emitting device but under the first transparent boards.

7. The input device of claim 1, wherein the control unit is utilized for turning on the second light-emitting device and turning off the first light-emitting device when displaying the first symbol, and for turning on the first light-emitting device and turning off the second light-emitting device when displaying the second symbol.

* * * * *